(12) United States Patent
Fukushima et al.

(10) Patent No.: US 7,527,030 B2
(45) Date of Patent: May 5, 2009

(54) CONTROL APPARATUS FOR INTERNAL COMBUSTION ENGINE

(75) Inventors: Yukihiro Fukushima, Haga-gun (JP); Yutaka Tamagawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/802,309

(22) Filed: May 22, 2007

(65) Prior Publication Data
US 2007/0272186 A1 Nov. 29, 2007

(30) Foreign Application Priority Data
May 24, 2006 (JP) ............................. 2006-143787

(51) Int. Cl.
*F02N 17/00* (2006.01)
*F02M 1/00* (2006.01)
(52) U.S. Cl. ....................... 123/179.3; 701/113; 290/34
(58) Field of Classification Search ............. 123/179.3, 123/179.1, 179.28; 701/113, 22, 69; 290/30 R, 290/31, 36 R, 38 C; 180/65.2; 318/139, 318/375, 376; 903/905, 917, 919, 927, 940–3, 903/945, 947
See application file for complete search history.

(56) References Cited
U.S. PATENT DOCUMENTS

| | | | |
|---|---|---|---|
| 5,495,127 A * | 2/1996 | Aota et al. ..................... 290/31 |
| 5,821,706 A * | 10/1998 | Koga ........................... 318/139 |
| 6,026,921 A * | 2/2000 | Aoyama et al. ............. 180/65.2 |
| 6,098,584 A * | 8/2000 | Ahner et al. ............... 123/179.3 |
| 6,420,793 B1 * | 7/2002 | Gale et al. ..................... 290/34 |
| 6,424,157 B1 * | 7/2002 | Gollomp et al. ............. 324/430 |
| 6,531,787 B2 * | 3/2003 | Koelle et al. .................. 290/31 |
| 2002/0020381 A1 * | 2/2002 | Pels ........................ 123/179.3 |
| 2002/0078914 A1 * | 6/2002 | Manabe et al. ........... 123/179.3 |
| 2002/0152980 A1 * | 10/2002 | Ahner et al. .............. 123/179.3 |
| 2006/0021808 A1 * | 2/2006 | McGee et al. .............. 180/65.2 |
| 2006/0021809 A1 * | 2/2006 | Xu et al. ................... 180/65.2 |

FOREIGN PATENT DOCUMENTS

| | | |
|---|---|---|
| JP | 58-31765 U | 3/1983 |
| JP | 2001-132594 A | 5/2001 |
| JP | 2005-020795 | 1/2005 |

* cited by examiner

*Primary Examiner*—Michael Cuff
*Assistant Examiner*—Hung Q Nguyen
(74) *Attorney, Agent, or Firm*—Arent Fox LLP

(57) ABSTRACT

A control apparatus for an internal combustion engine that is startable by a motor driven by electric power supplied by an electric storage device, includes: a starting mode selection device for selecting either a first mode or a second mode as starting mode of the internal combustion engine; a control device for setting an output mode during outputting the electric power to the motor from the electric storage device, according to a result selected by the starting mode selection device, wherein the control device is adapted to set a flat mode, corresponding to the first mode, in which a predetermined electric power is continuously output and a pulse mode, corresponding to the second mode, in which electric power that varies with amplitude greater than a predetermined amplitude is output.

11 Claims, 12 Drawing Sheets

CONTROL APPARATUS FOR INTERNAL COMBUSTION ENGINE

BACKGROUND OF THE INVENTION

1. Field of the Invention

The present invention relates to control apparatus for internal combustion engine.

Priority is claimed on Japanese Patent Application No. 2006-143787, filed May 24, 2006, the entire contents of which are incorporated herein by reference.

2. Description of the Related Art

In the past, to enhance the startability of internal combustion engines when the battery capacity decreased at very low temperatures or when the battery deteriorated, for instance, the use of a control apparatus that varied the torque characteristics of motor at specific voltages by switching the magnetic flux quantity by multiple circuits according to the number of turns of motor winding and according to the battery output voltage, is well known (for example, refer to Japanese Unexamined Patent Application, First Publication No. 2005-20795).

The control apparatus as an example of the related art mentioned above requires a plurality of circuits to be provided for changing motor torque characteristics to start the internal combustion engine. With the increasing complexity in the configuration of the apparatus, the size of the apparatus increases, and this becomes an issue.

Moreover, in a state where the battery temperature is low or when the state of charge has reduced, if current discharge is continuous, excessive voltage drop occurs, the power supplied to the motor reduces, and it is likely that the required torque necessary for starting an internal combustion engine may not be output easily. Furthermore, the issue of battery deterioration promoted by excessive voltage drop of the battery also arises.

SUMMARY OF THE INVENTION

An object of the present invention is to provide a control apparatus for an internal combustion engine that can appropriately start an internal combustion engine while preventing deterioration of the electric storage device that supplies power to the motor for starting the internal combustion engine, considering the circumstances mentioned above.

To achieve the object by solving the problems mentioned above, the present invention provides a control apparatus for an internal combustion engine that is startable by a motor driven by electric power supplied by an electric storage device, including: a starting mode selection device for selecting either a first mode or a second mode as starting mode of the internal combustion engine; a control device for setting an output mode during outputting the electric power to the motor from the electric storage device, according to a result selected by the starting mode selection device, wherein the control device is adapted to set a flat mode, corresponding to the first mode, in which a predetermined electric power is continuously output and a pulse mode, corresponding to the second mode, in which electric power that varies with amplitude greater than a predetermined amplitude is output.

According to the control apparatus for an internal combustion engine with the configuration mentioned above, the control device can set the output mode for output of electric power to the motor from the electric storage device to either the flat mode that continuously outputs a predetermined electric power, or the pulse mode that outputs electric power that varies with amplitude greater than a predetermined amplitude. As a result, by selecting either the flat mode or the pulse mode according to the state of the electric storage device, an internal combustion engine can be appropriately started while preventing deterioration of the electric storage device supplying electric power to the motor for starting the internal combustion engine.

In the control apparatus for an internal combustion engine mentioned above, a peak-to-peak value of the electric power output in the pulse mode by the control device may set to a value greater than a continuous rated output of the electric storage device in a specific state.

According to the control apparatus for an internal combustion engine of the present invention, by setting the peak-to-peak value of the electric power output in the pulse mode to a value greater than a continuous rated output of the electric storage device in a specific state, even if the required starting power for starting an internal combustion engine, for example, is greater than the continuous rated output of the electric storage device, an internal combustion engine can be appropriately started when the mean value of power at which the pulse mode changes is equivalent to the required starting power or is greater than the required starting power.

The control apparatus for an internal combustion engine may further include a temperature detection device to detect temperature of a power plant including an internal combustion engine and the motor, wherein the starting mode selection device may select the first mode as the starting mode when the temperature is higher than a predetermined value, and select the second mode as the starting mode when the temperature is lower than the predetermined value, based on the detection signal output by the temperature detection device.

According to the control apparatus for an internal combustion engine of the configuration mentioned above, by setting the second mode as the starting mode when the power plant temperature is lower than the predetermined value, even if the output of the electric storage device has reduced, an internal combustion engine can be appropriately started and excessive voltage drop that generally occurs is prevented, while inhibiting the deterioration of the electric storage device.

The control apparatus for an internal combustion engine may further include an output limiting device for setting an output limit value for the electric storage device based on a state of the electric storage device, wherein the starting mode selection device may select the first mode as the starting mode when the output limit value is greater than a predetermined value, and select the second mode as the starting mode when the output limit value is less than the predetermined value, based on the output limit value set by the output limiting device.

According to the control apparatus for an internal combustion engine of the configuration mentioned above, by setting the second mode as the starting mode when the output limit value for the electric storage device is less than the predetermined value, even if the output of the electric storage device has reduced, an internal combustion engine can be appropriately started and excessive voltage drop can be prevented, while inhibiting the deterioration of the electric storage device.

The control apparatus for an internal combustion engine may further include a state detection device to detect a quantity of state indicating a state of the electric storage device; the starting mode selection device may select the first mode as the starting mode when the quantity of state exceeds a predetermined quantity of state, and select the second mode as the starting mode when the quantity of state does not exceed the predetermined quantity of state, based on a detection signal output by the state detection device.

According to the control apparatus for an internal combustion engine of the configuration mentioned above, by selecting the second mode as the starting mode when the quantity of state indicating a state of the electric storage device does not exceed the predetermined quantity of state, even if the output of the electric storage device has reduced, an internal combustion engine can be appropriately started and excessive voltage drop can be prevented, while inhibiting the deterioration of the electric storage device.

In the control apparatus for an internal combustion engine with the configuration mentioned above, the state detection device may detect temperature of the electric storage device.

According to the control apparatus for an internal combustion engine of the configuration mentioned above, by selecting the second mode as the starting mode when the temperature of the electric storage device is less than a predetermined temperature, even if the output of the electric storage device has reduced, an internal combustion engine can be appropriately started and excessive voltage drop can be prevented, while inhibiting the deterioration of the electric storage device.

In the control apparatus for an internal combustion engine, the state detection device may detect a state of charge of the electric storage device.

According to the control apparatus of an internal combustion engine of the configuration mentioned above, by selecting the second mode as the starting mode when the state of charge of the electric storage device is less than a predetermined state of charge, even if the output of the electric storage device has reduced, an internal combustion engine can be appropriately started and excessive voltage drop can be prevented, while inhibiting the deterioration of the electric storage device.

In the control apparatus for an internal combustion engine, the state detection device may detect an output voltage of the electric storage device.

According to the control apparatus of an internal combustion engine of the configuration mentioned above, by selecting the second mode as the starting mode when the output voltage of the electric storage device is less than a predetermined output voltage, even if the output of the electric storage device has reduced, an internal combustion engine can be appropriately started and excessive voltage drop can be prevented, while inhibiting the deterioration of the electric storage device.

In the control apparatus for an internal combustion engine, the pulse mode, the control device may calculate a command value for an output of the electric storage device by a feedback process, and place a feedback system in a stable limit state during the feedback process.

According to the control apparatus for an internal combustion engine with the configuration mentioned above, the command value for output of the electric storage device can be oscillated without diverging by placing the feedback system in the stable limit state in the pulse mode during calculation by feedback processing of the command value for output of the electric storage device.

In the control apparatus for an internal combustion engine, the control device may set a specific duty ratio, which is a ratio of an ON/OFF state, as a command value for an output of the electric storage device in the pulse mode.

According to the control apparatus for an internal combustion engine of the configuration mentioned above, by setting the predetermined duty ratio, which is the ratio of the ON/OFF state, as the command value for an output of the electric storage device, the command value for output of the electric storage device can be changed alternately between the ON state and the OFF state in the pulse mode.

In the control apparatus for an internal combustion engine, the control device may set a value corresponding to a crank angle of an internal combustion engine as a command value for an output of the electric storage device in the pulse mode.

According to the control apparatus for an internal combustion engine of the configuration mentioned above, by setting the value corresponding to the crank angle of an internal combustion engine as the command value for output of the electric storage device, the command value corresponding to the changing friction resistance (engine friction) of an internal combustion engine can be set.

As described above, according to the control apparatus for an internal combustion engine of the present invention, by selecting either the flat mode or the pulse mode depending on the condition of the electric storage device, an internal combustion engine can be appropriately started while preventing deterioration of the electric storage device that supplies power to the motor for starting the internal combustion engine.

Furthermore, according to the control apparatus for an internal combustion engine of the present invention, even if the required starting power for starting an internal combustion engine, for example, is greater than the continuous rated output of the electric storage device, an internal combustion engine can be appropriately started when the mean value of power at which the pulse mode changes is equivalent to the required starting power or is greater than the required starting power.

Also, according to the control apparatus for an internal combustion engine of the present invention, even if the output of the electric storage device has reduced, an internal combustion engine can be appropriately started and the excessive voltage drop that generally occurs can be prevented, while inhibiting the deterioration of the electric storage device.

Moreover, according to the control apparatus for an internal combustion engine of the present invention, the command value for output of the electric storage device can be oscillated without diverging by placing the feedback system in the stable limit state in the pulse mode during calculation by feedback processing of the command value for output of the electric storage device.

Moreover, according to the control apparatus for an internal combustion engine of the present invention, by setting the predetermined duty ratio, which is the ratio of the ON/OFF state, as the command value for output of the electric storage device, the command value for output of the electric storage device can be changed alternately between the ON state and the OFF state.

Furthermore, according to the control apparatus for an internal combustion engine of the present invention, by setting the value corresponding to the crank angle of an internal combustion engine as the command value for output of the electric storage device, the command value corresponding to the changing friction resistance (engine friction) of an internal combustion engine can be set.

DETAILED DESCRIPTION OF THE INVENTION

A control apparatus for an internal combustion engine according to a first embodiment of the present invention is described hereafter referring to the attached drawings.

Figure 1:
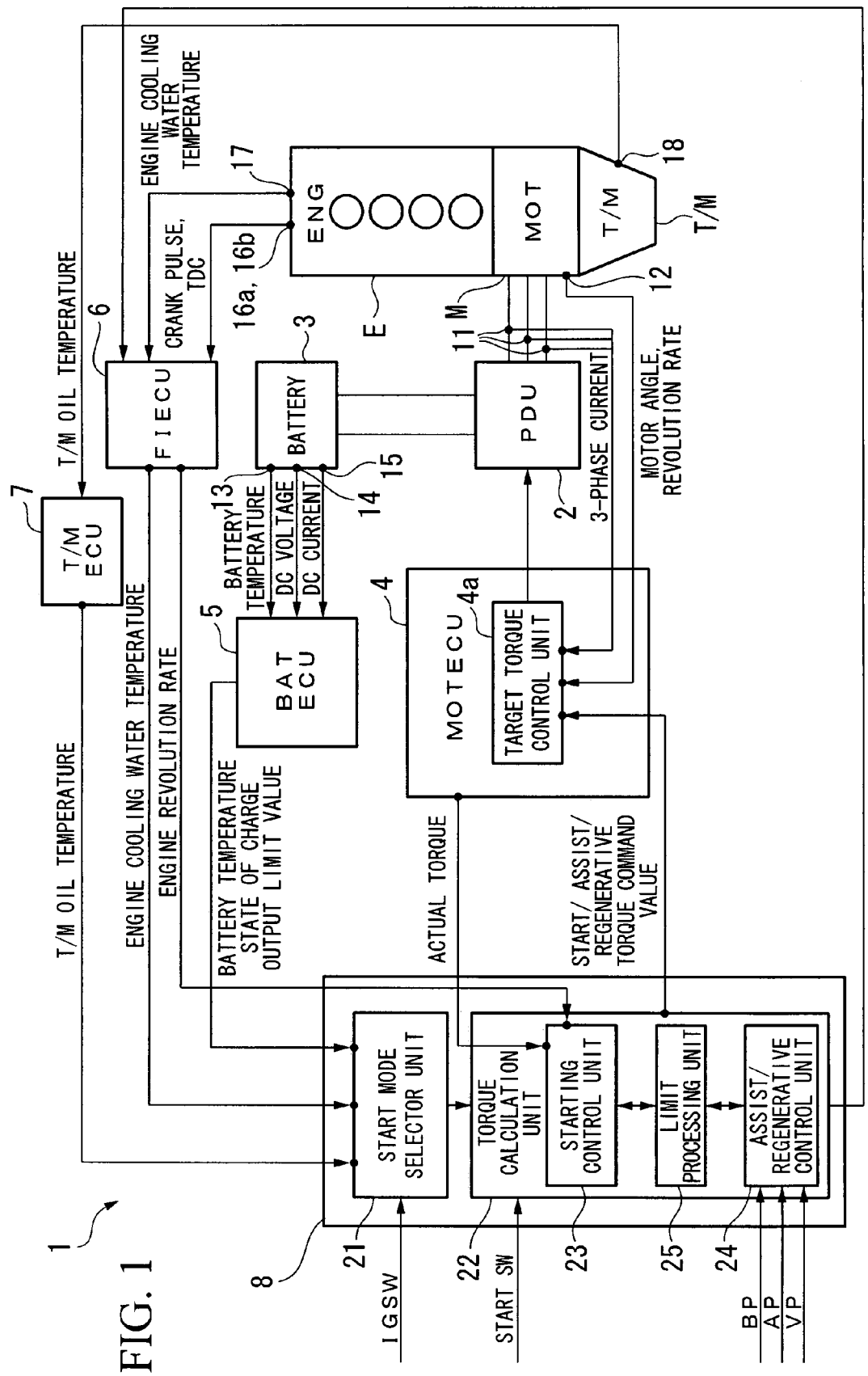
FIG. 1 shows the configuration of a control apparatus for an internal combustion engine according to a first embodiment of the present invention.

As shown in FIG. 1, the control apparatus for an internal combustion engine according to the first embodiment of the present invention, is provided, for example, in a vehicle such as a parallel hybrid vehicle. This vehicle is constructed by directly connecting an internal combustion engine E, a motor M, and a transmission unit T/M in series. The drive forces of an internal combustion engine E and the motor M are transmitted to the drive wheels of the vehicle through the differential that distributes the drive forces between the left and right drive wheels (front wheels or rear wheels) from the transmission unit T/M, such as a continuously variable transmission unit. When the drive force is transmitted from the drive wheel side to the motor M side during deceleration of the hybrid vehicle, the motor M works as a generator and generates the so-called regenerative braking force, and the kinetic energy of the vehicle body is recovered as electric energy. Moreover, depending on the running state of the vehicle, the motor M is driven as a generator by the output of an internal combustion engine E so that it generates electric power.

The control apparatus 1 for internal combustion engine, for example, is provided with an internal combustion engine E, motor M, transmission unit T/M, power drive unit (PDU) 2, high voltage based nickel-metal hydride battery (battery) 3, MOTECU4, BATECU5, FIECU6, T/MECU7, and MGECU8.

For instance, the motor M, which may be a 3-phase DC brushless motor, is connected to the power drive unit (PDU) 2. The power drive unit 2 may be provided with a PWM inverter implementing pulse width modulation (PWM) equipped with bridge circuits formed by bridges using multiple transistor switching elements, and may be connected to the motor M and battery 3 that transfers power (power supplied to motor M during powered operation (drive or assist), or regenerative energy output by motor M during regenerative operation).

The power drive unit 2 receives the control command from MOTECU4, drives the motor M and performs the regenerative operation. That is, the power drive unit 2 converts the DC power output by the battery 3 to three-phase AC power, based on the gate signal (i.e., a certain pulse width modulated signal which is a switching command from each pulse that drives each switching element of the PWM inverter ON/OFF) when driving the motor M, for example, and supplies it to the motor M. On the other hand, during the regenerative operation of the motor M, it converts the three-phase AC power output by the motor M to DC power and charges the battery 3.

MOTECU4 is provided with a target torque control unit 4a that controls feedback of current required for output by the motor M of torque corresponding to the torque command (for example, each torque command corresponding to starting torque, assist torque, regenerative torque and so on) input from MGECU8 mentioned later. This target torque control unit 4a performs control such that, for example, each difference in the current command value corresponding to torque command and in the current detection value corresponding to phase current supplied to each phase of the motor M from the power drive unit (PDU) 2 becomes zero.

For this reason, the detection signal output by the phase current detector 11 that detects the phase current supplied from each phase of motor M, and the detection signal output by rotation sensor 12 that detects the revolution rate and the motor angle (i.e., angle of rotation of magnetic pole from the predetermined reference rotation position) of motor M are input in MOTECU4.

MOTECU4 calculates the actual torque generated from the actual motor M based on each detection signal and outputs it to MGECU8.

BATECU5 calculates the state of charge of the battery 3, for example, according to the temperature (battery temperature) of the battery 3, charging current and discharging current (i.e., current on the DC side of PWM inverter of PDU2: direct current) of the battery 3, and the terminal voltage (i.e., voltage on the DC side of PWM inverter of PDU2: DC voltage) of the battery 3, and also sets the output limit value for current for protecting the battery 3, and outputs the results to MGECU8.

For this reason, the detection signal output by the temperature detector 13 that detects the battery temperature, the detection signal output by the voltage detector 14 that detects the DC voltage, and the detection signal from the current detector that outputs DC current are input in BATECU5.

FIECU6 controls the running state of an internal combustion engine E, such as the fuel supply to an internal combustion engine E, the ignition timing, and so on.

For this reason, detection signal from the TDC sensor 16a that detects the top dead center position TDC in the compression stroke of the piston of an internal combustion engine E, the detection signal output by crank angle sensor 16b that outputs the signal pulse (crank pulse) at a predetermined crank angle period shorter than the period of the TDC pulse output by TDC sensor, and the detection signal output by the temperature sensor 17 that detects the temperature (engine cooling water temperature) of cooling water of an internal combustion engine E are input in FIECU6.

Based on each of these detection signals, FIECU6 calculates the revolution rate (engine revolution rate) of the internal combustion engine, and outputs the same to MGECU8.

T/MECU7 controls the speed change operation of the transmission unit T/M. The detection signal output by the temperature sensor 18 to detect the temperature (T/M oil temperature) of hydraulic oil of the transmission unit T/M is input in it.

MGECU8 may be provided with a start mode selector unit 21 and a torque calculation unit 22. Also, the torque calculation unit is provided with a starting control unit 23, an assist/regenerative control unit 24, and a limit processing unit 25.

The start mode selector unit 21 selects the starting mode of an internal combustion engine E depending on various kinds of temperature conditions such as battery temperature, engine cooling water temperature, and T/M oil temperature, the state of charge of the battery 3, the DC voltage of the battery 3, and the output limit value when starting the vehicle or when re-starting the stopped an internal combustion engine E from idle condition by the drive force of the motor M.

For this reason, the signal indicating ON/OFF condition of the ignition switch (IGSW) is input in the start mode selector unit 21.

For example, when the battery temperature is higher than a predetermined temperature, or when the state of charge of the battery 3 is greater than a predetermined state of charge, or when the DC voltage of the battery 3, is greater than a predetermined voltage, or when the output limit value of the battery 3 is higher than a predetermined output value, then the start mode selector unit 21 selects a flat starting mode as the starting mode of an internal combustion engine E.

Figure 2:
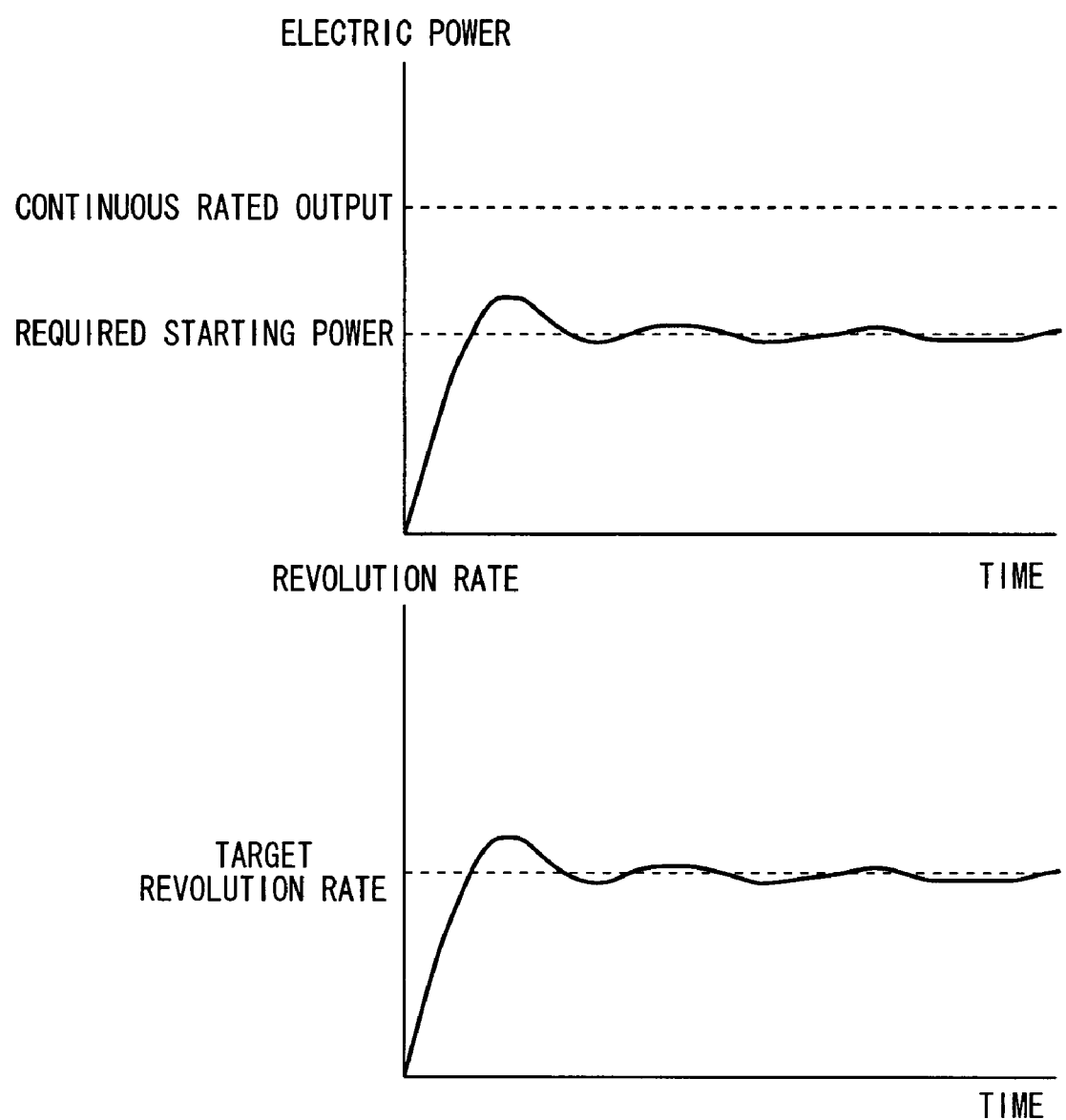
FIG. 2 is a graph showing an example of time-domain changes in the power output of a battery and the revolution rate of a motor M in a flat starting mode.

As shown in FIG. 2, for example, power equivalent to the specific power (required starting power) necessary to start an internal combustion engine E by the drive force of the motor M is continuously output by the battery 3 in this flat starting mode. As a result, the revolution rate of the motor M is changed so as to converge to a predetermined target revolution rate required for starting an internal combustion engine E.

In this case, the required starting power is smaller than the rated output (continuous rated output) that can be continuously output by the battery 3.

On the other hand, when the battery temperature is lower than the predetermined temperature, or when the state of charge of the battery 3 is smaller than the predetermined state of charge, or when the DC voltage of the battery 3 is smaller than the predetermined voltage, or when the output limit value of battery 21 is lower than the predetermined output value, then the start mode selector unit 21 selects a pulse starting mode as the starting mode of an internal combustion engine E.

Figure 3:
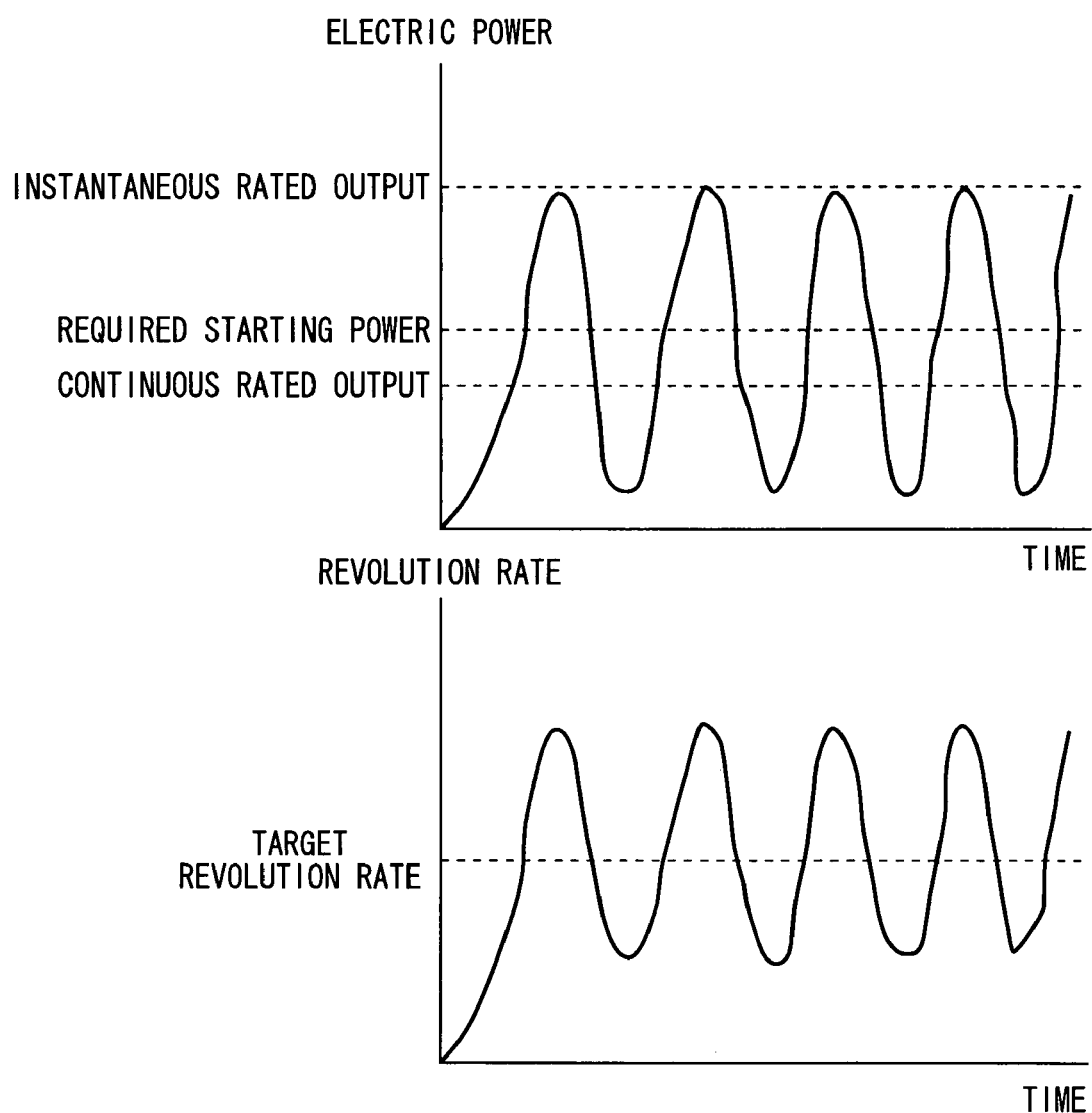
FIG. 3 is a graph showing an example of time-domain changes in the power output of the battery and the revolution rate of the motor M in a pulse starting mode.

As shown in FIG. 3, for example, in the pulse starting mode, the required starting power becomes greater than the rated output (continuous rated output) that can be output continuously from the battery 3. Therefore, the output of the battery is changed so that the mean output of the battery 3 (for example, timewise average and so on) becomes equivalent to the required starting power or greater than the required starting power, while intermittently outputting instantaneous rated output (i.e., rated output that can be output instantaneously from the battery 3) greater than the required starting power. As a result, the revolution rate of the motor M changes, and the mean value of this changing revolution rate (for example, timewise average) becomes equivalent to the predetermined target revolution rate or greater than the predetermined target revolution rate necessary for starting an internal combustion engine E.

Each determination threshold value used as reference in the starting mode selection (i.e., a predetermined temperature, a predetermined state of charge, a predetermined voltage, a predetermined output value) is the determination threshold value related to the condition at which a specific output necessary for starting an internal combustion engine E can be appropriately output by the battery 3.

For instance, when the battery temperature is below the predetermined temperature, the current that can be output by the battery 3 (i.e., power) reduces, and at the same time, the internal resistance increases with the drop in battery temperature.

Therefore, when current is continuously output by the battery 3, for instance, then the voltage drops, and the deterioration of the battery 3 will be accelerated.

Also, for instance, when the state of charge is less than the predetermined state of charge, or when DC voltage of the battery 3 is lower than the predetermined voltage, and when current is continuously output by battery 3, for instance, then the voltage further drops, and the deterioration of the battery 3 will be accelerated.

When the output limit value of the battery 3 is less than the predetermined output value, for instance, in the condition when current is continuously output by the battery 3, the problem arises that the specific output necessary for starting an internal combustion engine cannot be ensured.

The torque calculation unit 22 calculates the torque command value (starting torque command value) according to the starting mode of an internal combustion engine E selected by the start mode selector unit 21, and outputs it to MOTECU4.

Also, the torque calculation unit 22 calculates the torque command value (assist torque command value or regenerative torque command value) according to the running state of the vehicle, and outputs it to MOTECU.

For this reason, the signal indicating the ON/OFF state of the start switch (start SW), the detection signal from the brake switch for detecting the operating status of the brake pedal (BP), the detection signal from the accelerator pedal opening sensor for detecting the accelerator pedal opening indicating the amount the accelerator pedal has been depressed (AP), and the detection signal from the vehicle speed sensor for detecting the speed of the vehicle (VP) are input into the torque calculation unit 22.

Figure 4:
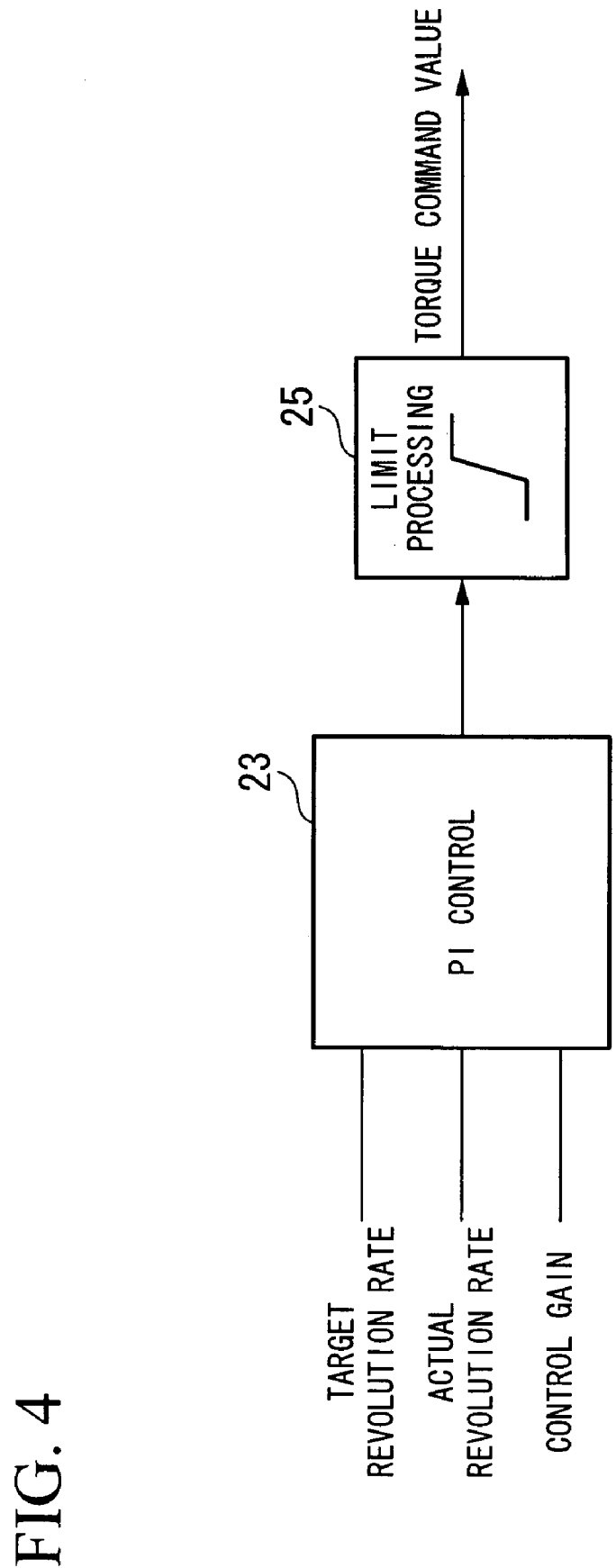
FIG. 4 shows the configuration of the starting control unit and limit processing unit according to the first embodiment of the present invention.

The starting control unit 23 of the torque calculation unit 22 calculates the difference between the target revolution rate and the actual revolution rate corresponding to the engine revolution rate, as shown in FIG. 4, for example. Control amplification of this difference is performed by the proportional integration (PI) operation corresponding to the starting mode of an internal combustion engine E selected by the start mode selector unit 21, and the torque command value is calculated.

For instance, the starting control unit 23 acquires the control gain that converges the difference between the target revolution rate and the actual revolution rate to zero in the flat starting mode by retrieving the predetermined map set beforehand, and calculates the torque command value. In this case, the compensation due to feed forward, for example, may be combined with the PI operation.

On the other hand, in the pulse starting mode, the starting control unit 23 acquires the control gain for placing the feedback process system in a stable limit state by retrieving the predetermined map set beforehand, for instance, according to various kinds of temperature such as the battery temperature, engine cooling water temperature, T/M oil temperature, or the state of charge of the battery 3, or the DC voltage of the battery 3, and calculates the torque command value. In this stable limit state, the torque command value will be changed through oscillations at an amplitude above the predetermined amplitude without diverging.

In this case, the control gain will be set such that the Nyquist locus of the open-loop transfer function of the feedback process system, for example, becomes the stable limit.

The assist/regenerative control unit 24 calculates the torque command value (assist torque command value or regenerative torque command value) that specifies implementation of assist operation or regenerative operation of the motor M, according to the operating status of the brake pedal, for example, the accelerator pedal opening indicating the amount of accelerator pedal depressed, and the running state of the vehicle based on the speed of the vehicle, by retrieving the predetermined map set beforehand.

The limit processing unit 25 processes limits by the predetermined upper torque limit value and the lower torque limit value corresponding to the torque command value calculated by the starting control unit 23 and the torque command value calculated by the assist/regenerative control unit 24.

The control apparatus of an internal combustion engine according to the present embodiment is provided with the configuration mentioned above. Next, the operation of the control apparatus of this internal combustion engine, especially the process for starting an internal combustion engine by the drive force of the motor M, is explained below.

The starting mode selection process is described below.

Figure 5:
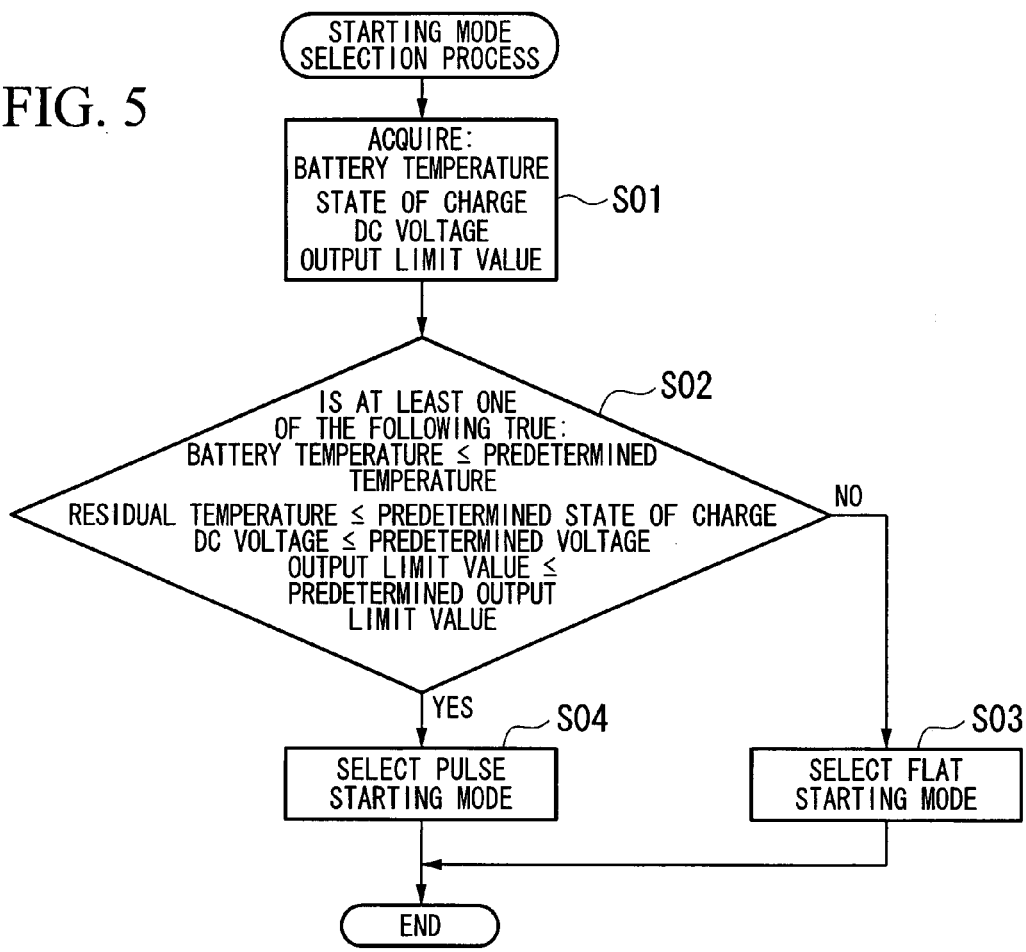
FIG. 5 is a flowchart showing the starting mode selection process according to the first embodiment of the present invention.

Firstly, in step S01 shown in FIG. 5, at least one of the following is acquired: battery temperature, state of charge of the battery 3, DC voltage of the battery 3, and output limit value of the battery 3.

In step S02, the following determination is made: Is the battery temperature lower than a predetermined temperature (Determination 1), or is the state of charge of the battery 3 smaller than a predetermined state of charge (Determination 2), or is the DC voltage of the battery 3 smaller than a predetermined voltage (Determination 3), or is the output limit value of the battery 3 lower than a predetermined output value (Determination 4).

When the result of the determination in step S02 is "NO" (none of the Determinations 1-4 indicate positive results), then the process advances to step S03. The flat starting mode is selected as the starting mode of an internal combustion engine E, and a series of processes is completed.

On the other hand, when the result of the determination in step S02 is "YES" (at least one of Determinations 1-4 indicates a positive result), then the process advances to step S04. The pulse starting mode is selected as the starting mode of an internal combustion engine E, and a series of processes is completed.

During the determination processing in step S02, in addition to determining whether the temperature of the power plant including an internal combustion engine E and the motor M (engine cooling water temperature detected from the temperature sensor 17 and/or the temperature of hydraulic oil of the transmission unit T/M detected by the temperature sensor 18) is less than the predetermined value (Determination 5), when none of Determinations 1-5 indicate positive results, the flat starting mode is selected as the starting mode of an internal combustion engine E; when any one of Determinations 1-5 indicates a positive result, then the pulse starting mode may be selected as the starting mode of an internal combustion engine E.

The process for calculating the starting torque is described below.

Figure 6:
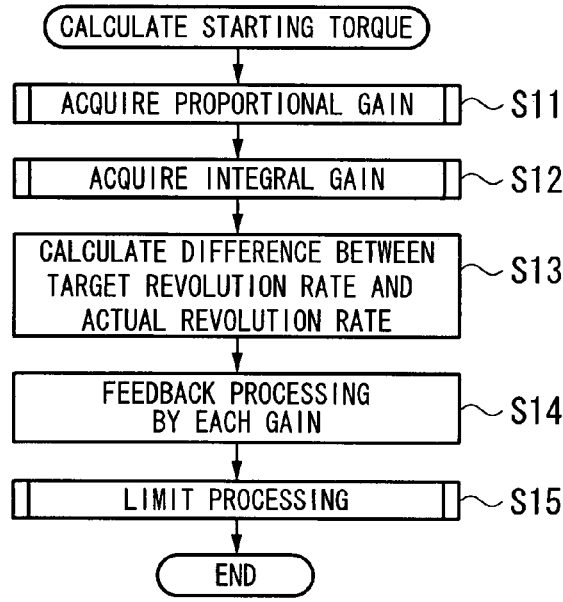
FIG. 6 is a flowchart showing the starting torque calculation process according to the first embodiment of the present invention.

First, in step S11 shown in FIG. 6, for example, the proportional gain for placing the feedback process system in the stable limit state is acquired by retrieving the predetermined map set beforehand, for instance, according to various kinds of temperature such as the battery temperature, engine cooling water temperature, T/M oil temperature, and so on, or according to the state of charge of the battery 11, or the DC voltage of the battery 3.

Next, in step S12, for instance, the integral gain for placing the feedback process system in the stable limit state is acquired by retrieving the predetermined map set beforehand, for example, according to various kinds of temperature such as the battery temperature, engine cooling water temperature, T/M oil temperature, and so on, or according to the state of charge of the battery 3, or the DC voltage of the battery 3.

Next, in step S113, the difference in the target revolution rate and the actual revolution rate corresponding to the engine revolution rate is calculated.

Next, in step S13, control amplification of the difference between the target revolution rate and the actual revolution rate is performed by the proportional integration operation using proportional gain and integral gain, and the feedback process for calculating the torque command value is implemented.

Next, in step S15, limits are processed according to the predetermined upper torque limit and lower torque limit values corresponding to the torque command values calculated by feedback process, and a series of processes is completed.

Figure 7:
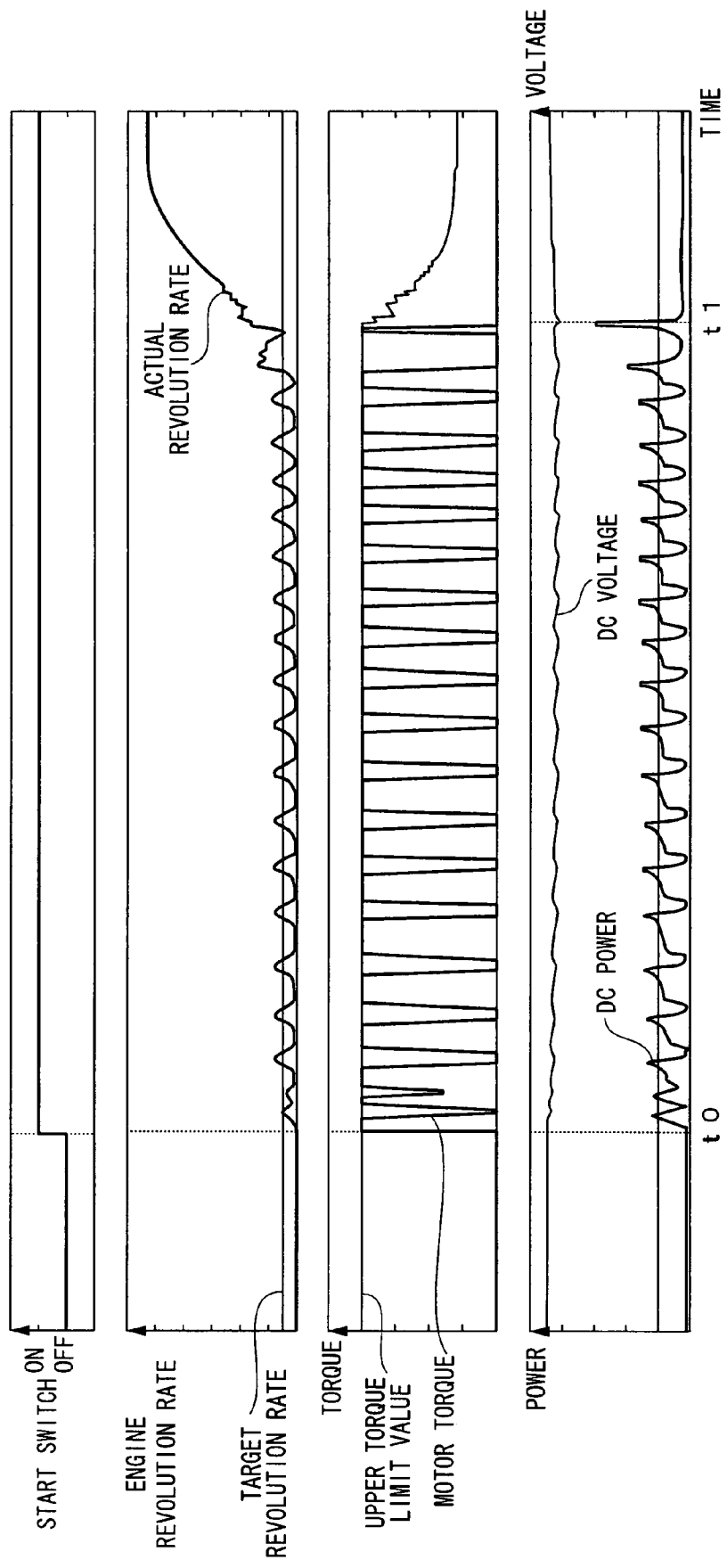
FIG. 7 is a graph showing an example of time-domain changes in the actual revolution rate of the engine with respect to a target revolution rate of the engine, the motor torque, DC power, and DC voltage in the pulse starting mode according to the first embodiment of the present invention.

For instance, as shown in FIG. 7, in the pulse starting mode, from the time t0 when the start switch that specifies starting an internal combustion engine E is set to the ON state from the OFF state until the time t1 when the starting of an internal combustion engine E is appropriately completed, the motor torque output by the motor M varies, for instance, in the range from zero to the predetermined upper torque limit value depending on the changing torque command value. As a result, the actual revolution rate of the engine revolution rate changes such that the mean value becomes equivalent to the predetermined target revolution rate necessary for starting an internal combustion engine E or greater than the target revolution rate.

In this state, the power (DC power) output by the battery 3 changes to the pulse state, and the DC voltage of the battery 3 is prevented from falling excessively below the predetermined lower limit voltage.

Figure 8:
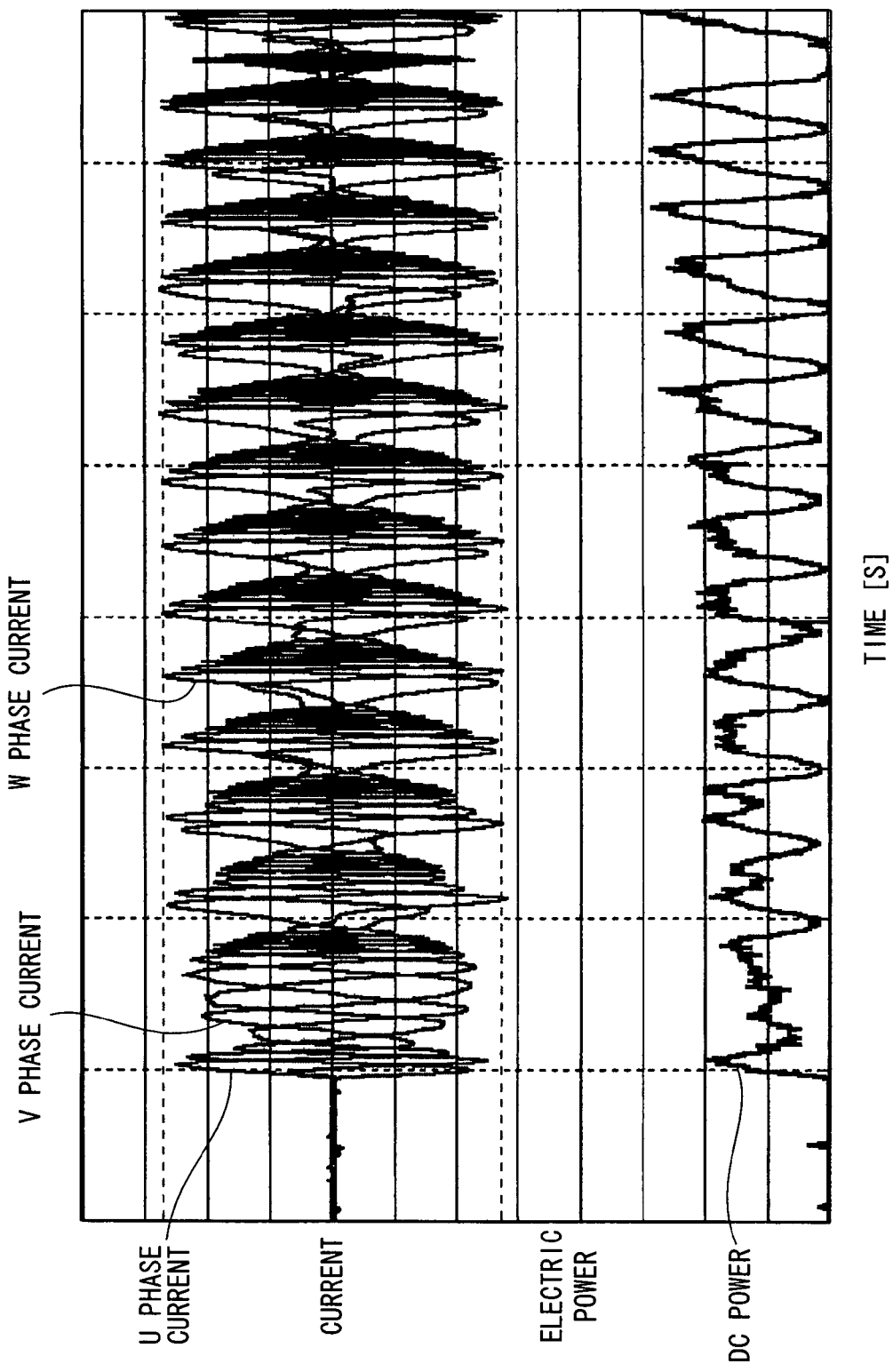
FIG. 8 is a graph showing an example of a time-domain change in each phase current that is energized in each motor phase in the pulse starting mode according to the first embodiment of the present invention.

Moreover, in this pulse starting mode, the peak-to-peak values of the U phase current, the V phase current, and the W phase current in each phase of the motor M vary, as shown in FIG. 8, for instance.

As described above, according to the control apparatus 1 for an internal combustion engine according to the present embodiment, by selecting the flat starting mode or the pulse starting mode as the starting mode of an internal combustion engine E according to the state of the battery 3, an internal combustion engine E can be started appropriately while preventing deterioration of the battery 3 that supplies power to the motor M to start an internal combustion engine E.

Figure 9:
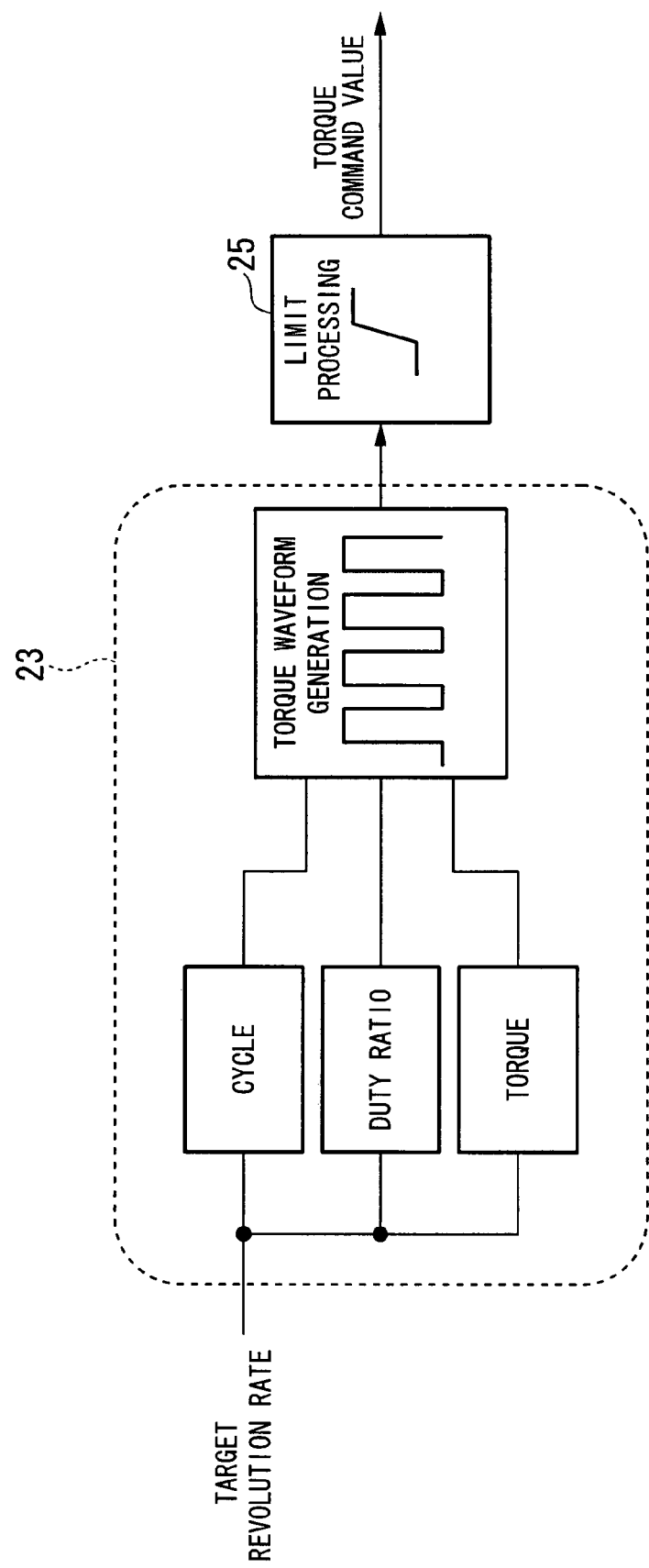
FIG. 9 shows the configuration of the starting control unit and the limit processing unit according to a first example of modification of the embodiment of the present invention.

In the embodiment mentioned above, the starting control unit 23 of the torque calculation unit 22 calculates the torque command value by the proportional integration (PI) operation corresponding to the starting mode of an internal combustion engine E. However, the embodiment of the present invention is not limited to this mode only. As shown in FIG. 9, for example, a pulse state torque command value can be set such that the predetermined ON state and OFF state alternately repeats, based on the target revolution rate corresponding to the engine revolution rate.

In this first example of modification, the starting control unit 23 acquires torque in the ON state and the torque in the OFF state corresponding to the ON/OFF state cycle (duty cycle) and ON/OFF state ratio (duty ratio) from the target revolution rate corresponding to the engine revolution rate, by retrieving the predetermined map set beforehand and calculates the torque command in the pulse state.

The duty cycle, duty ratio, torque in the ON state, and torque in the OFF state may be set to vary according to the various conditional quantities such as temperature of power plant due to an internal combustion engine E and the motor M.

Moreover, the torque in the OFF state may be zero or a value other than zero.

The process for calculating the starting torque in the first example of modification is described below.

Figure 10:
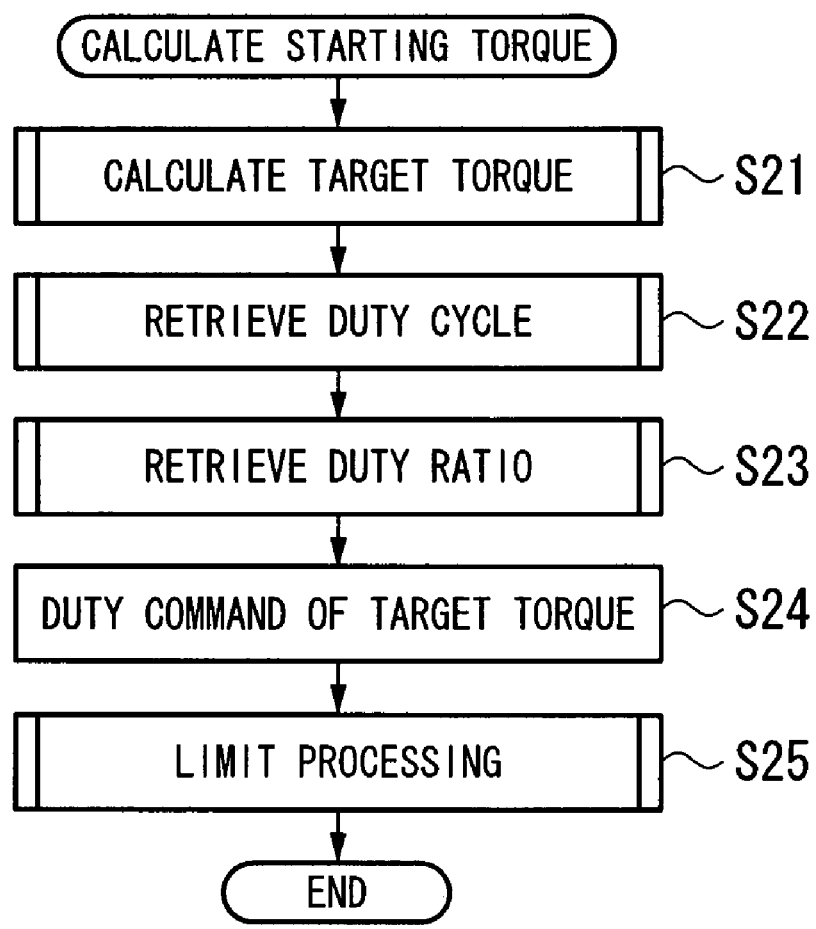
FIG. 10 is a flowchart showing the starting torque calculation process according to the first example of modification of the embodiment of the present invention.

First, in step S21 shown in FIG. 10, for example, the target torque corresponding to the torque output by the motor M is acquired by retrieving the predetermined map set beforehand, for instance, according to various kinds of temperature such as the battery temperature, engine cooling water temperature, T/M oil temperature, and so on, and according to the target revolution rate.

First, in step S22, for example, the duty cycle corresponding to the target revolution rate, is acquired by retrieving the predetermined map set beforehand, for instance.

Next, in step S23, for instance, the duty ratio is acquired by retrieving the predetermined map set beforehand, for instance, according to various kinds of temperature such as the battery temperature, engine cooling water temperature, T/M oil temperature, and so on, and according to the target revolution rate.

Next, in step S24, the target torque is taken as the torque in the ON state, zero or value other than zero (<target torque) is taken as the torque in the OFF state, and the duty command of the target torque is calculated according to the duty cycle and the duty ratio.

Next, in step S25, limits are processed according to the predetermined output limit value corresponding to the output of the battery 3, and the rated torque of motor M corresponding to the calculated duty command, and a series of processes is completed.

Figure 11:
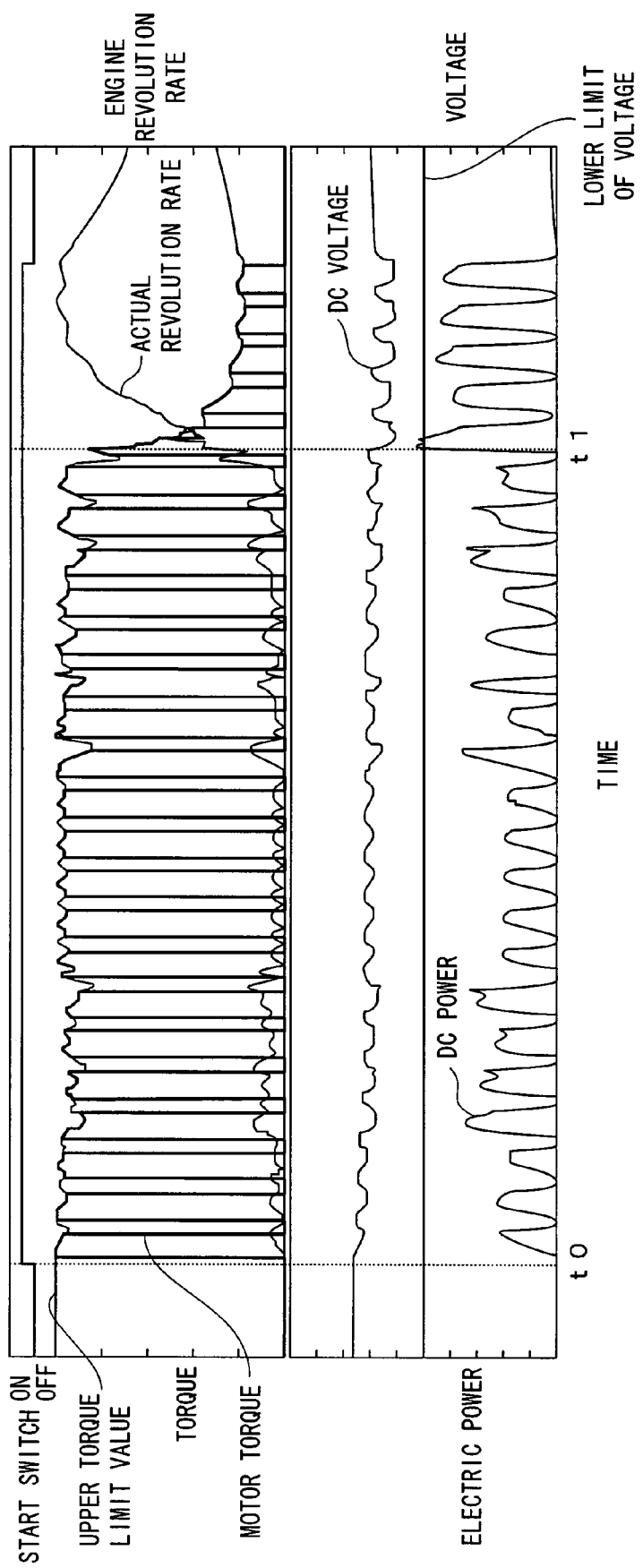
FIG. 11 is a graph showing an example of time-domain changes in the actual revolution rate, the motor torque, DC power, and DC voltage in the pulse starting mode according to the first example of modification of the embodiment of the present invention.

In this first example of modification, for instance, as shown in FIG. 11, in the pulse starting mode, from the time t0 when the start switch that specifies starting an internal combustion engine E is set in the ON state from the OFF state until the time t1 when the starting of an internal combustion engine E is appropriately completed, the motor torque output by the motor M varies, for instance, depending on the duty command of the target torque such that the ON/OFF is alternately repeated between the torque in the OFF state and the upper torque limit value depending on the torque in the ON state taken as target torque or the limit process. As a result, the actual revolution rate of the engine revolution rate changes such that the mean value becomes equivalent to the predetermined target revolution rate necessary for starting an internal combustion engine E, or greater than the target revolution rate.

In this state, the power (DC power) output by the battery 3 changes to the pulse state, and the DC voltage of the battery 3 is prevented from falling excessively below the predetermined lower limit voltage.

Figure 12:
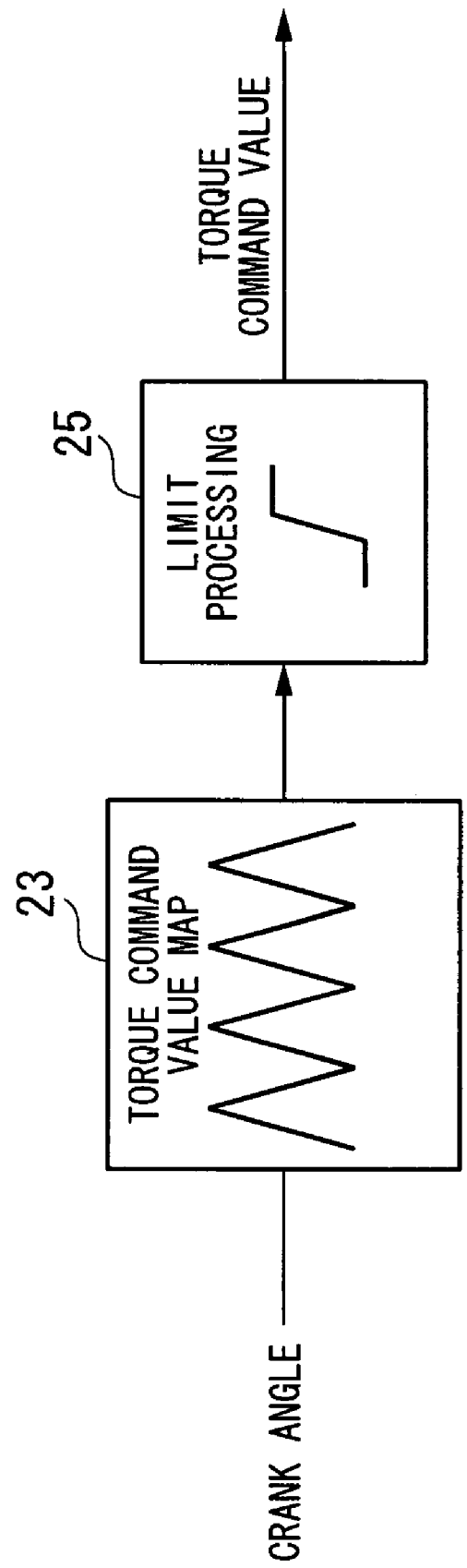
FIG. 12 shows the configuration of the starting control unit and the limit processing unit according to a second example of modification of the embodiment of the present invention.

In the embodiment mentioned above, the starting control unit 23 of the torque calculation unit 22 calculates the torque command value by the proportional integration (PI) operation corresponding to the starting mode of an internal combustion engine E. However, this embodiment of the present invention is not limited to this mode. As shown in FIG. 12, for example, a torque command value that changes depending on the crank angle of an internal combustion engine E may be set.

In this second example of modification, in the pulse starting mode, the starting control unit 23 sets the torque command value according to the predetermined crank angle corresponding to the crank pulse, i.e., according to the frictional resistance (engine friction) of an internal combustion engine E that varies with the compression and expansion strokes of each cylinder of an internal combustion engine E. For instance, with the increase in engine friction, it increases the torque command value, and with the decrease in engine friction, it reduces the torque command value.

Figure 13:
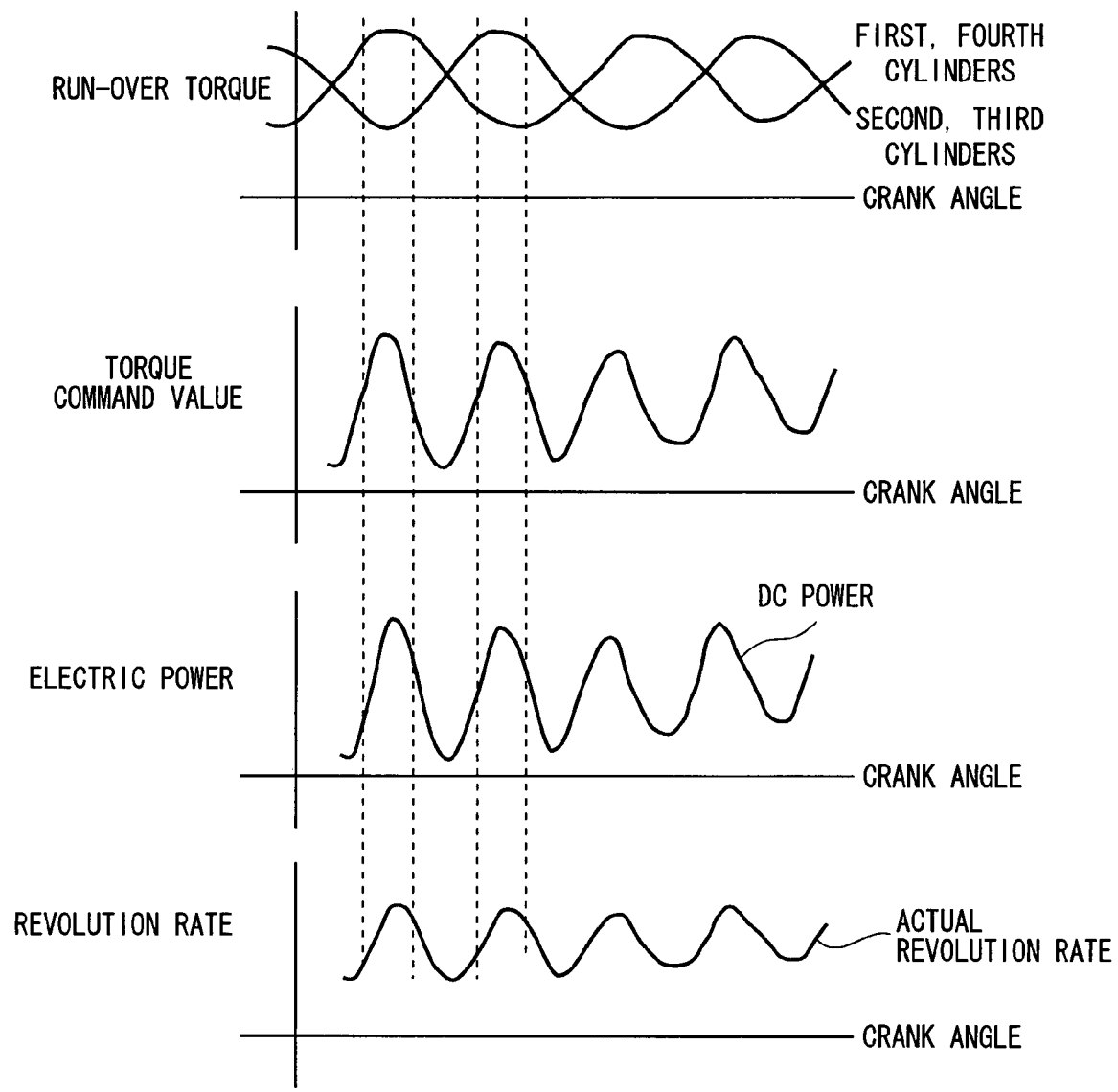
FIG. 13 is a graph showing an example of changes, in accordance with the crank angle, in the run-over torque of the internal combustion engine, torque command value, DC power, and actual engine revolution rate in the pulse starting mode according to the second example of modification of the embodiment of the present invention.

From the above, as shown in FIG. 13, for example, settings are made such that for a four-cylinder an internal combustion engine E, the torque command value increases at crank angles for which the run-over torque of the first and second cylinders, or the run-over torque of the second and third cylinders increases relatively, and the torque command value decreases at crank angles for which the run-over torque of the first and the fourth cylinders decreases relatively.

As a result, the actual revolution rate of the engine revolution rate changes such that the mean value becomes equivalent to the predetermined target revolution rate necessary for starting an internal combustion engine E or greater than the target revolution rate, the power (DC power) output by the battery 3 changes to the pulse state, and the DC voltage of the battery 3 is prevented from reducing excessively below the predetermined lower limit voltage.

What is claimed is:

1. A control apparatus for an internal combustion engine that is startable by a motor driven by electric power supplied by an electric storage device, comprising:
   a starting mode selection device for selecting either a first mode or a second mode as starting mode of the internal combustion engine;
   a control device for setting an output mode during outputting the electric power to the motor from the electric storage device, according to a result selected by the starting mode selection device, wherein
   the control device is adapted to set a flat mode, corresponding to the first mode, in which a predetermined electric power is continuously output and a pulse mode, corresponding to the second mode, in which electric power that varies with amplitude greater than a predetermined amplitude is output.

2. The control apparatus according to claim 1, wherein a peak-to-peak value of the electric power output in the pulse mode by the control device is set to a value greater than a continuous rated output of the electric storage device in a specific state.

3. The control apparatus according to claim 1, further comprising a temperature detection device to detect temperature of a power plant including an internal combustion engine and the motor, wherein
   the starting mode selection device selects the first mode as the starting mode when the temperature is higher than a predetermined value, and selects the second mode as the starting mode when the temperature is lower than the predetermined value, based on the detection signal output by the temperature detection device.

4. The control apparatus according to claim 1, further comprising an output limiting device for setting an output limit value for the electric storage device based on a state of the electric storage device, wherein
the starting mode selection device selects the first mode as the starting mode when the output limit value is greater than a predetermined value, and selects the second mode as the starting mode when the output limit value is less than the predetermined value, based on the output limit value set by the output limiting device.

5. The control apparatus according to claim 1, further comprising a state detection device to detect a quantity of state indicating a state of the electric storage device, wherein
the starting mode selection device selects the first mode as the starting mode when the quantity of state exceeds a predetermined quantity of state, and selects the second mode as the starting mode when the quantity of state does not exceed the predetermined quantity of state, based on a detection signal output by the state detection device.

6. The control apparatus according to claim 5, wherein the state detection device detects temperature of the electric storage device.

7. The control apparatus according to claim 5, wherein the state detection device detects a state of charge of the electric storage device.

8. The control apparatus according to claim 5, wherein the state detection device detects an output voltage of the electric storage device.

9. The control apparatus according to claim 1, wherein, in the pulse mode, the control device calculates a command value for an output of the electric storage device by a feedback process, and places a feedback system in a stable limit state during the feedback process.

10. The control apparatus according to claim 1, wherein the control device sets a specific duty ratio, which is a ratio of an ON/OFF state, as a command value for an output of the electric storage device in the pulse mode.

11. The control apparatus according to claim 1, wherein the control device sets a value corresponding to a crank angle of an internal combustion engine as a command value for an output of the electric storage device in the pulse mode.

* * * * *